Aug. 21, 1951
R. T. COLLIER
2,564,833
SULFUR DIOXIDE PROCESS AND APPARATUS
USING RECYCLED GASES
Filed Jan. 25, 1946
2 Sheets-Sheet 1
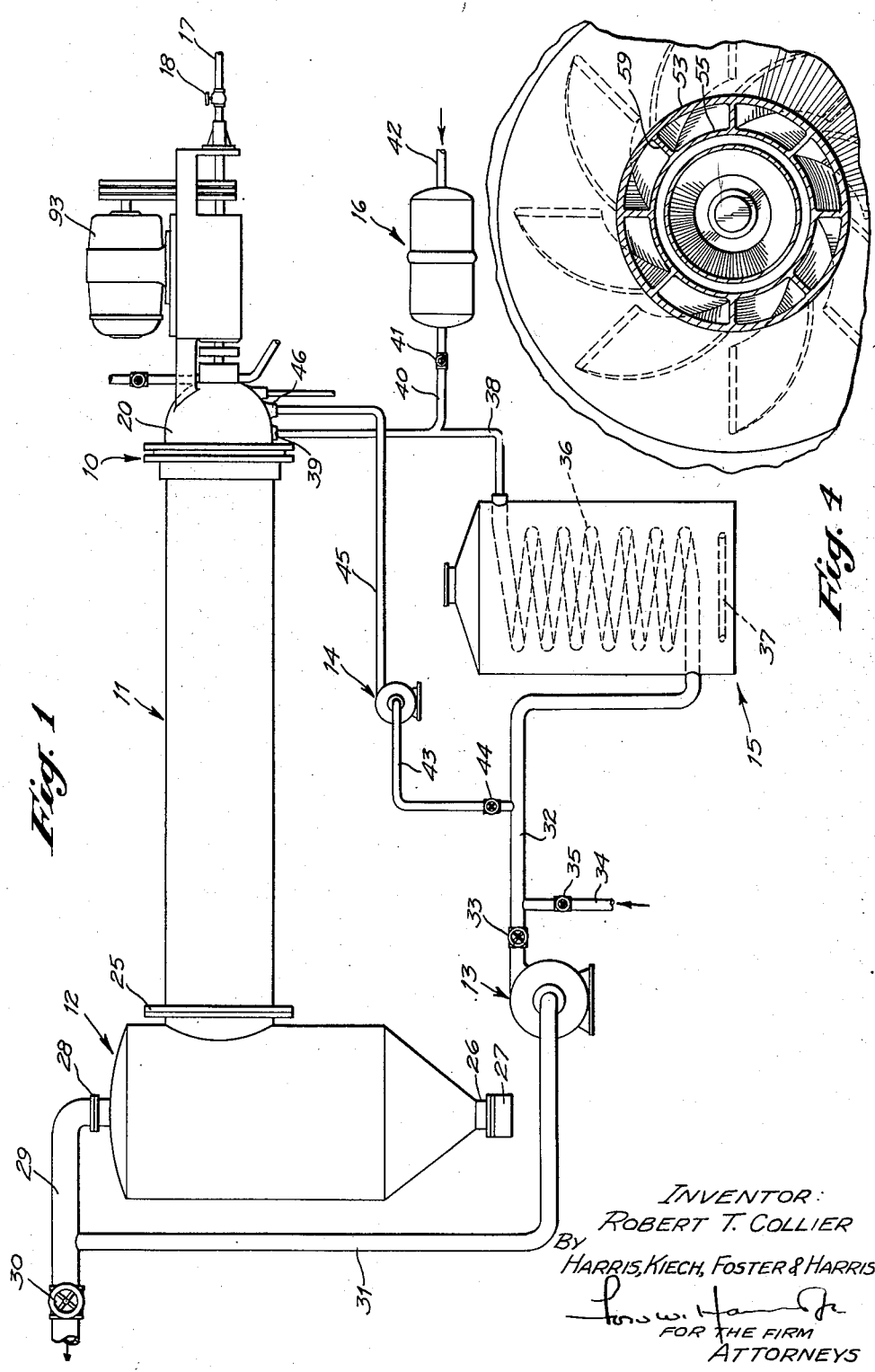
INVENTOR:
ROBERT T. COLLIER
By
HARRIS, KIECH, FOSTER & HARRIS
FOR THE FIRM
ATTORNEYS

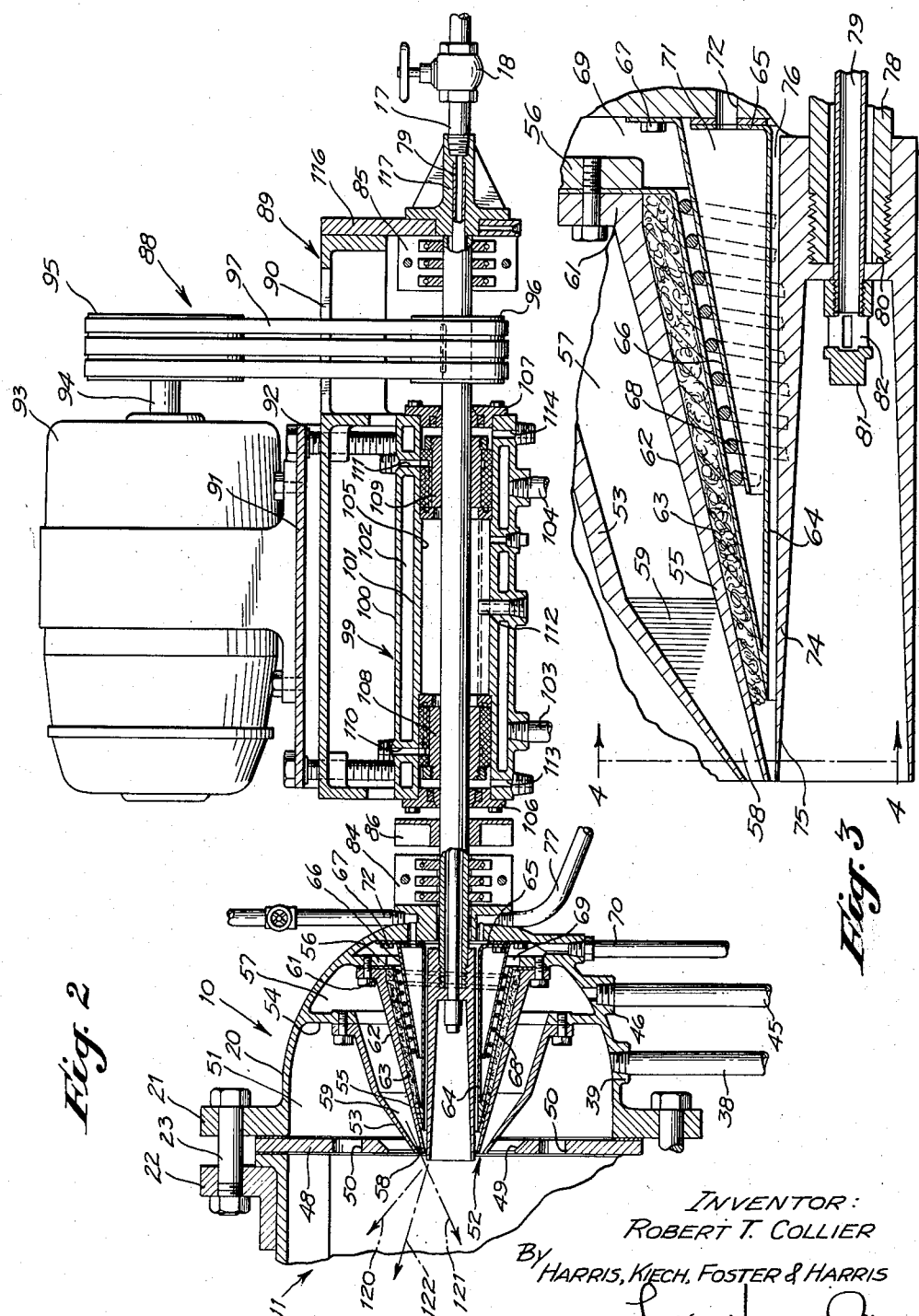

Patented Aug. 21, 1951

2,564,833

UNITED STATES PATENT OFFICE 2,564,833

SULFUR DIOXIDE PROCESS AND APPARATUS USING RECYCLED GASES

Robert T. Collier, Palos Verdes Estates, Calif., assignor, by mesne assignments, to Union Oil Company of California, Los Angeles, Calif., a corporation of California Application January 25, 1946, Serial No. 643,367

11 Claims. (Cl. 23—178)

My invention relates to the art of making carbon and other products, and, more particularly, to the making of such products from petroleum residues.

In the petroleum industry large quantities of petroleum residues resulting from various refining processes are normally wasted or rendered of less value, and it is a primary object of this invention to convert such residues to more valuable products which may be further used in industry. For example, one such residue is acid sludge, resulting from the treatment of petroleum oils with strong sulfuric acid, which sludge contains substantial quantities of hydrocarbons as well as sulfuric acid and acid products. A further example of such a residue is spent alkylation acid resulting from various alkylation processes commonly used in oil refining, which also contains substantial quantities of hydrocarbons as well as sulfuric acid and acid products. A further example of such a residue is any conventional residual fuel oil. By suitable treatment, a large part of the hydrocarbons in such residues may be converted to coke or other valuable carbon products and distillates. Furthermore, where such residues contain sulfuric acid, it is highly desirable to recover the acid constituents, usually in the form of sulfur dioxide, for further use. Normally, such residues have been regarded largely as waste products, due to the difficulty and expense of treating them to recover their valuable constituents, and my present process provides a simple, economical, and efficient method of recovery of such constituents. Such residues are collectively referred to hereinafter for convenience as the "charging stock."

It is well known that a sizable proportion of the hydrocarbons in such charging stock may be reduced to coke or carbon by the application of heat thereto. No satisfactory apparatus or process has been developed to my knowledge, however, for commercially treating such charging stock containing acid. This is in part due to the highly viscous and gummy nature of acid sludge or heavy residues when used as a charging stock, and the tendency of the coke, carbon, and other carbonaceous products formed therefrom to ball up and adhere to the walls of the tubes or vessel in which it is heated. This is very undesirable, as it requires frequent shut-downs of the equipment to permit cleaning of the walls thereof of coke, carbon, and other hard carbonaceous residues deposited thereon during the heating operation, which, in turn, is difficult and costly. It is therefore another object of my present invention to provide such an apparatus and method for heating such a charging stock that coke, carbon, or other carbonaceous products produced thereby will not stick or adhere to the walls of the vessel or chamber in which the heating operation is carried out. I have found that one reason for the usual sticking of carbonaceous products to the walls of the heating chamber, pointed out in the preceding paragraph, is that such charging stock is conventionally poured or discharged into the heating chamber in a stream of relatively large cross-sectional area and tends to ball up into large sticky masses or solid deposits in the heating chamber. I have also discovered that if such charging stock is broken up into fine drops, or atomized, and so injected into the heating chamber, the carbonaceous material in each of the drops may be sufficiently reduced to solid coke or carbon while in a vapor suspension so that it will not stick or adhere to the walls to any substantial extent, and this is a further object of my invention.

Furthermore, I have discovered that, if the charging stock is so atomized and injected into a heating chamber in atomized form to provide it in a vapor suspension, the carbonaceous material therein is reduced to coke or carbon in a very short period of time, which is only a fraction of the treating time employed in conventional processes, and this is another object of the invention. As will be apparent, this result is due to the very efficient distribution of heat throughout the atomized charging stock, due to the fact that such charging stock is treated in a vapor suspension, which is a further object of the invention. As will also be apparent, the increased heating efficiency derived by my process greatly reduces fuel costs in the practice of the process, which is still a further object of the invention.

I have also discovered that, by controlling the degree of atomization of the charging stock as it is injected into the heating chamber, the size of the resulting coke or carbon particles may be effectively controlled within wide limits. For example, if the charging stock is finely atomized, the resulting coke or carbon produced will be very finely divided, ranging down to only a few microns in size. By coarsening the degree of atomization the resulting particle size may be substantially increased. Accordingly, this concept of controlling particle size by controlling the degree of atomization of the charging stock is a further object of the invention.

As will have been evident from the foregoing remarks, my process is adapted to produce coke or carbon in finely divided form. This has not been possible with prior art methods of treating such a charging stock, to my knowledge, and is another object of the invention. The production of such a finely divided product is very desirable, as it has a variety of uses in industry, and may be handled readily and conveniently. For example, by forming such a finely divided solid product, it may be readily conveyed from the heating chamber by a gas stream, which greatly facilitates handling of the product and is also an object of the invention.

In the heat treatment of such charging stocks containing sufuric acid at temperatures sufficient to produce coke or carbon, as described above, sulfuric acid contained in the charging stock is decomposed to produce sulfur dioxide. Such sulfur dioxide is a valuable product of the process, as it may be converted by a conventional contact process to produce fresh sulfuric acid. Various attempts have been made in the art to so utilize such charging stock by decomposing the acid content to form sulfur dioxide, and many expedients have been developed for accomplishing this end. One such method now in commercial use includes the use of granular coke or sand as a heating medium which is heated to a relatively high temperature and passed through a rotary kiln into which the charging stock is admitted, the heating medium heating the charging stock to a decomposition temperature at which the sulfuric acid is decomposed to form sulfur dioxide and most of the hydrocarbons of the charging stock are reduced to solid coke. It is normally necessary to mix a relatively small amount of charging stock with a relatively large amount of hot coke to secure a free flowing mixture and to subject it to the desired relatively high decomposition temperatures, it being common practice to mix twenty or more parts by weight of the coke with one part of the charging stock to accomplish this result. This, as will be appreciated, requires the mechanical handling of extremely high tonnages of granular coke per day, with attendant high costs and mechanical difficulties with the handling equipment.

In order to avoid the difficulties inherent in such conventional methods, it is a further object of my present invention to provide a method and apparatus for heat treating such a charging stock, which process is or may be continuous, and which utilizes a gaseous heating medium to secure the treating temperatures required to form coke or sulfur dioxide, or both. In this connection, I have found that gaseous products of such decomposition, which include substantial quantities of sulfur dioxide and which are substantially inert so far as the process is concerned, may profitably be employed as a heating medium, and this is another object of the invention. To accomplish this, I prefer to lead such gaseous products from the heating chamber, raise the temperature of at least a portion thereof to or above the desired decomposition temperature, and then to recycle such portion back through the heating chamber in heat exchanging relation with fresh charging stock so as to decompose the same to produce additional decomposition products. Obviously, such recycled gaseous products form a heating medium which is readily handled in conventional piping and which can be efficiently heated to increase its temperature to the desired degree. Also, as will be apparent, the concentration of sulfur dioxide in the resulting gases is substantially increased over that produced by conventional processes requiring dilution of the sulfur dioxide, which is very desirable where such sulfur dioxide is to be utilized in the manufacture of sulfuric acid or liquid sulfur dioxide. In the preferred practice of my process there is no dilution of the gaseous decomposition products, which dilution necessarily occurs in prior art methods where the burning of combustible gases and an excess of air is employed to provide the required heating temperature. Also, in my process the temperature of the recycled gases may be accurately and easily controlled. As will also be apparent, the temperature of the gaseous decomposition products conveyed from the heating chamber will be at or only slightly below the desired decomposition temperature employed in the chamber, and, consequently, only a small amount of additional heat is required to bring the recycled gases up to the temperature required to employ them as a heating medium, which provides substantial fuel economy in the system.

I have also found that the recycled gases serving as a heating medium in the heating chamber also are well adapted to serve as an atomizing medium for atomizing the charging stock injected into the chamber, and this is a further object of my invention. In this connection, I prefer to inject the charging stock into the heating chamber and to surround the stream thereof with a stream of the heated recycled gases travelling at relatively high velocity and at an angle to the normal direction of discharge of the charging stock, so as to adequately atomize the same.

I have found that only a portion of the recycled decomposition gases need be used as an atomizing medium for the charging stock and, accordingly, it is a further object of my invention to divide such recycled gases into two portions, one portion to be used primarily as an atomizing medium and the other portion to be used primarily as a heating medium, and conducting the atomizing portion through the injector to atomize the charging stock and conducting the heating portion separately into the heating chamber. In such practice of the invention I have further discovered that it is desirable to maintain the atomizing portion of the recycled gases at a relatively low temperature to avoid as far as possible any preliminary decomposition of the charging stock in the injector. It is therefore another object of the invention to conduct the heating portion of the recycled gases into the heating chamber at a temperature at or in excess of the decomposition temperature required for the charging stock, but to conduct the atomizing portion into the injector at a temperature below such decomposition temperature. I have also found that, although the atomizing portion of the recycled gases must be put under substantial pressure in order to satisfactorily pass through the injector and atomize the charging stock, the pressure required merely to recycle the heating portion of such gases can be relatively low. Consequently, it is a further object of the invention to raise the pressure of all of the recycled gases only sufficiently to convey the heating portion thereof through the system, separate an atomizing portion from such flow, and then raise the pressure of such atomizing portion to the pressure required by the injector. This latter practice effects substantial power economies, as only a relatively small capacity blower is required to raise the pressure of the atomizing portion to the desired figure, whereas a relatively large capacity blower is required if all of the recycled gases are to be raised to the pressure required for the atomizing portion.

Still another object of the invention is to provide in such an apparatus and method novel means for initially bringing the system up to treating temperature. For this purpose, I prefer to burn hydrogen sulfide in a separate burner and circulate the products of the combustion thereof as a heating medium until the system is up to temperature, following which the burning of hydrogen sulfide may be discontinued if desired. Such burning of hydrogen sulfide forms additional suflur dioxide and adds it to the products of decomposition formed from the charging stock, which is desirable where the process is being employed for the production of sulfur dioxide.

A further object of the invention is to provide a novel type of injector adapted to atomize a heavy charging stock as described, the details of a preferred form of such an injector being described hereinafter.

Other objects and advantages of the invention will be apparent from the following specification and the drawings, which are for the purpose of illustration only, and in which:

Fig. 1 is a diagrammatic flow diagram of the apparatus of my invention;

Fig. 2 is an enlarged longitudinal sectional view of the injector device of the invention;

Fig. 3 is an enlarged fragmentary sectional view of the nozzle of the injector device; and Fig. 4 is a cross-sectional view taken on the line 4—4 of Fig. 3.

Referring to the drawings, Fig. 1 shows an injector 10, a reaction chamber 11, a separator 12, a main blower 13, an auxiliary blower 14, a gas heater 15, and a burner 16.

The injector 10 is adapted to be supplied with a liquid charging stock, such as, for example acid sludge or alkylation acid, or a liquid containing both or either of them, by a supply pipe 17 provided with an inlet valve 18. The injector 10, described in detail hereinafter, includes a housing 20 provided with an annular end flange 21 by which the housing is rigidly clamped to a suitable flange 22 carried by the reaction chamber 11 by bolts 23.

The reaction chamber 11 is preferably of elongated tubular design, such as to maintain a relatively high velocity of atomized material longitudinally therein, and the design thereof may be varied within wide limits. I have found that by using a reaction chamber approximately 10 inches in internal diameter and about 6 feet long sufficient gas velocity may be maintained therethrough. The other end of the reaction chamber 11 is connected by a pipe connection 25 with the separator 12, which is merely a vertical closed pressure tank having a suitable discharge port 26 in the lower end thereof which is normally closed by a suitable removable cap 27. The top of the separator 12 is connected by a pipe connection 28 with a gas discharge pipe 29, leading to a suitable point of disposal or use (not shown). Disposed in the gas discharge pipe 29 is a valve 30, which is of the pressure relief type adapted to hold a predetermined back pressure in the system. Pressure required in the system need be only high enough to provide a sufficient velocity to the products of decomposition formed in the reaction chamber 11 so that no clogging of the system occurs. Although I prefer to maintain such gauge pressure at 40 to 60 pounds per square inch, other pressures may be employed if desired.

Connected to the discharge pipe 29, between the valve 30 and the pipe connection 28, is a conduit pipe 31 connected to the suction side of the main booster blower 13, the pressure outlet of which is connected by a conduit 32 to the gas heater 15. A check valve 33 is provided in the conduit 32 to prevent a reverse flow therethrough, and a pipe 34, having a valve 35 therein, is connected to the conduit between the valve 33 and the heater 15.

The gas heater 15 is of any conventional type, and, as diagrammatically shown, includes a coil 36 passing therethrough over a burner 37, the coil being connected at one end to the conduit 32 and at its other end to a conduit 38 which in turn is connected to a pipe connection 39 of the injector 10. Connected to the conduit 38 is an auxiliary heat supply pipe 40, having a valve 41 therein, which is connected to the burner 16. The burner 16 is of any conventional type, well known in the art, adapted to burn hydrogen sulfide or other fuel, such as natural gas, supplied through an auxiliary supply pipe 42 from a suitable source (not shown), and to discharge the products of such combustion through the pipe 40 into the conduit 38.

Also connected to the conduit 32 is an atomizing gas pipe 43 which is connected to the suction side of the auxiliary blower 14 and has a flow regulating valve 44 therein, the pressure side of the auxiliary blower being connected by a pipe 45 with a pipe connection 46 provided on the housing 20 of the injector 10.

The injector 10 includes a circular baffle plate 48 which is clamped between the housing 20 and the reaction chamber 11 and which is provided with a central circular opening 49 and a plurality of ports 50 spaced around the opening and between it and the periphery of the baffle plate, the opening 49 and the ports 50 communicating with a primary chamber 51 in the housing. Disposed in the housing 20 and secured rigidly therein and directed toward the reaction chamber 11 is a nozzle 52, which includes an outer conical wall 53 which is rigidly screwed to an annular flange 54 formed on the housing, and an inner conical wall 55 rigidly screwed to an annular flange 56 provided on the housing. The flanges 54 and 56 and the walls 53 and 55 form a secondary chamber 57 therebetween, the outer ends of the walls being spaced apart to provide an annular discharge orifice 58. Disposed in the discharge orifice 58 are a plurality of vanes 59 which are spaced apart and helical in form, as best illustrated in Fig. 4, being adapted to provide a swirling motion to gas discharged from the secondary chamber 57 through the orifice 58 into the reaction chamber 11.

Clamped between the inner conical wall 55 and its retaining flange 56 is an annular flange 61 of a conical wall 62 which is radially spaced from the inner conical wall 55, heat insulation material 63 being provided therebetween. Secured within the conical wall 62 is a tubular sleeve 64 which is provided with an annular flange 65 by which it is rigidly secured to the inner wall of the housing 20, the outer end of the tubular sleeve being secured, as by welding or otherwise, in fluid-tight relation with the outer end of the conical wall 62. Disposed between the conical wall 62 and the tubular sleeve 64 is a conical separating wall 66 which is spaced from but parallel with the conical wall 62, being secured to the housing by suitable screws 67. Disposed between the conical separating wall 66 and the conical wall 62 is a helical spring 68, the coils of which are separated to provide a helical passage between the two walls. The conical wall 62 and the conical separating wall 66 form an outer chamber 69 having a pipe connection 70 communicating therewith, and the separating wall 66 and the tubular sleeve 64 form an inner chamber 71 having a pipe connection 72 communicating therewith, the inner ends of the chambers communicating around the inner end of the separating wall.

Axially disposed within the tubular sleeve 64 is a rotatable cup member 74, which is best illustrated in Fig. 3, and which includes a central discharge chamber 75 which is conical in form. As will be noted, the outer wall of the cup member 74 is spaced radially from the inner wall of the tubular sleeve 64 so as to provide an annular space 76 therebetween, with which communicates a pipe connection 77. Threadedly received in one end of the cup member 74 is a rotatable driving sleeve 78 through which extends a feed tubing 79, the driving sleeve being seated against a shoulder 80 formed in the cup member but the feed tubing extending therethrough into the central discharge chamber 75 of the cup member. The end of the feed tubing 79 which extends into the discharge chamber 75 has threaded thereto a cap element 81 having discharge slots 82 therein which communicate between the interior of the feed tubing 79 and the central discharge chamber 75.

Encircling the driving sleeve 78 and disposed adjacent each of its ends are sealing members 84 and 85 which are adapted to provide fluid seals therearound, and may be of any conventional type. Carried on the driving sleeve 78 is a fan member 86 which is adapted to expel outwardly any gases which may leak past the sealing member 84.

A motor and bearing assembly 88 is provided for rotatably supporting and driving the driving sleeve 78. It includes a framework 89 providing a top plate 90 on which a motor base 91 is supported by suitable screws 92. An electric motor 93 is supported by the motor base 91 and has a drive shaft 94 carrying a V-belt pulley 95 which is operatively connected to a V-belt pulley 96 on the driving sleeve 78 by a plurality of V-belts 97. It is desirable to be able to vary the rotational speed of the driving sleeve 78 and, consequently, the motor 93 may be of the variable-speed type or the pulleys 95, 96 may be of the variable-diameter type, well known in the art. The framework 89 has formed integrally therewith or secured thereto a cylinder 99 having an outer cylindrical wall 100 and an inner cylindrical wall 101 spaced apart to form an annular cooling chamber 102 therebetween, the ends of the cooling chamber communicating with suitable pipe fittings 103 and 104. The inner cylindrical wall 101 defines a cylindrical lubrication chamber 105 around the rotatable driving sleeve 78, the ends of the lubrication chamber being closed by closure plates 106 and 107. Disposed in the lubrication chamber 105 are sleeve bearings 108 and 109 which rotatably support the driving sleeve 78. A lubrication opening 110 communicates with the sleeve bearing 108, and a lubrication opening 111 communicates with the sleeve bearing 109, through which oil or other lubricating medium may be fed to the bearings. Disposed in the bottom of the cylinder 99 is a stand pipe 112 which projects upwardly through the walls of the cylinder into the lubricating chamber to provide means for controlling the level of lubricating fluid retained in the chamber, any excess flowing downwardly through the stand pipe and out therethrough. Also communicating with the cylindrical chamber 105 outside of the bearings 108 and 109 are drainage ports 113 and 114 through which lubricating fluid leaking from the chamber 105 past the bearings may discharge. A cooling medium, such as water, may be introduced into the cooling chamber 102 through the pipe fitting 103, the cooling medium flowing outwardly therefrom through the pipe fitting 104, and serving to cool the bearings 108 and 109. As will also be understood, the sealing member 84 provides a fluid seal between the injector 10 and the rotatable driving sleeve 78.

Secured to one end of the framework 89 is an end plate 116 which has a flange pipe fitting 117 secured thereto and extending therethrough into which the outer end of the feed tubing 79 extends. The supply pipe 17 is also threaded into the pipe fitting 117 so as to communicate with the outer end of the feed tubing. As will be understood, the sealing member 85 forms a fluid-tight seal between the rotatable driving sleeve 78 and the end plate 116.

To operate the invention the valve 18 in the charging stock supply line 17 is first closed and the valve 30 opened to vent the heating system, and the system is then brought up to the required heat, after which valve 30 is adjusted to maintain the desired pressure, and the blower 13 is started. If desired, this may be accomplished by admitting superheated steam through the pipe 34 from a suitable source (not shown) by opening the valve 35. Such steam flows through the conduit 32 to heater 15, in which it may be additionally heated if desired, and flows therefrom through the conduit 38 to the injector 10. In using this method of starting, the valve 41 is preferably closed so as to shut off the burner 16 which need not be employed. The steam, which in this practice of the invention serves as an initial heating medium, flows into the housing 29 of the injector 10, through the primary chamber 51 thereof, the opening 49 and ports 50, and into the reaction chamber 11. The steam then heats the reaction chamber 11 and the separator 12. The circulation of steam is continued until the temperature in the reaction chamber 11 is raised to a point at which charging stock to be introduced therein will be decomposed to produce solid carbon and sulfur dioxide, or either and until pressure in the system is built up to the desired point, and, preferably, until substantially all air is removed from the system.

An alternative method of starting the practice of the process is to close the valve 35 and open the valve 41, so as to open the burner 16 to the system, the charging stock inlet valve 18 being closed and the valve 30 opened to vent the system. In this practice of the invention, hydrogen sulfide, or other suitable fuel, such as natural gas, is burned in the burner 16, the products of combustion thereof being conveyed through the auxiliary heat supply pipe 40 and through the conduit 38 and the injector 10 into the reaction chamber 11 and separator 12 to heat the same and to build up the desired pressure therein as described in connection with the alternative practice of starting with steam.

When the reaction chamber 11 and the separator 12 have been heated to a suitable temperature, the valve 30 is adjusted to build up the desired pressure in the system, the blowers 13 and 14 being started and the valve 44 adjusted so that the gas passing through the main blower 13 is split into two portions, one portion, which may be referred to as the heating portion, passing through the heater 15, the conduit 38 and into the primary chamber 51 of the injector 10, and the other portion, which may be referred to as the atomizing portion, passing through the pipe 43, the blower 14, the pipe 45, and into the secondary chamber 57 of the injector.

When the desired pressure has been attained in the system, the electric motor 93 is energized to rotate the driving sleeve 78 through the belts 97, and the inlet valve 18 is opened to admit charging stock from the supply pipe 17 to the feed tubing 79. The charging stock flows through the feed tubing 79 and is discharged therefrom into the discharge chamber 75 of the rotating cup member 74. Due to the conical form of the discharge chamber 75 and the rotation of the cup member 74, the charging stock is impelled from the inner open end thereof into the reaction chamber 11, being generally in the form of a thin conical sheet of charging stock. The normal angle of emergence of such charging stock from the cup member 74 in the absence of any concurrent flow of atomizing medium from the nozzle 52 is relatively great, such as that illustrated by dotted lines 120 in Fig. 2. The atomizing medium injected into the reaction chamber 11 from the nozzle 52, however, travels at relatively high velocity due to the constricted annular orifice 58 through which it passes, and is directed inwardly in the direction of the arrow 121 of Fig. 2. As the injected atomizing medium is on the outside of the injected cone of charging stock, the atomizing medium impinges directly on the charging stock with substantial force, breaking up and atomizing the stream of charging stock, and directing it more in the direction as indicated by dotted lines 122 in Fig. 2. The atomizing action of the atomizing medium is due largely to the difference in the natural angles of emergence from the injector 10 of the charging stock and the atomizing medium, and provides a satisfactory atomization of the charging stock even though the same is highly viscous liquid such as, for example, acid sludge. Also, as will be appreciated, rotation of the cup member 74 imparts a spinning motion to the charging stock issuing therefrom into the reaction chamber 11 in the direction of such rotation, and, since the spinning motion of the charging stock is opposite to the spinning motion of the heating medium, as provided by the vanes 59, such opposed spinning actions tend to further increase the efficiency of the atomization of the charging stock. In practice, I have found that operating at the system pressures described the fluid pressure drop of the atomizing medium through the injector 10 may be about two pounds per square inch to attain the desired atomizing action therein. Consequently, the auxiliary blower 14 need be only large enough to raise the pressure of the atomizing portion of the recycled gases by this amount. As will also be understood from the foregoing, the main blower 13 can be of the large capacity but low pressure type, as the increase in pressure needed to circulate the heating portion of the recycled gases is relatively low.

I have also found that the degree of atomization of the charging stock can be satisfactorily controlled by controlling the speed of rotation of the cup member 74. The higher the speed of rotation of the cup member 74, within limits, the greater is the normal angle of emergence of the charging stock therefrom, and the greater is the atomizing action of the atomizing medium impinging on such charging stock. I have found that in one embodiment of the invention the degree of atomization of the charging stock may be adequately controlled by rotating the cup member 74 at speeds of 1700 to 7000 revolutions per minute, which range of speeds is illustrative only. It will be apparent that the degree of atomization is also affected by other factors such as, for example, the velocity of discharge of the atomizing medium from the nozzle 52 and the angle of emergence thereof. Consequently, although I prefer to vary the degree of atomization of the charging stock by charging the rotation speed of the cup member I do not desire to be limited thereto.

The charging stock, being thus atomized into fine droplets or particles, forms a mist comprising a suspension of the charging stock in the heating medium in the reaction chamber 11, and is conveyed through the reaction chamber in such form by the heating medium and by the velocity given thereto by the atomizing medium issuing from the nozzle 52. Due to the fine dispersion of the charging stock in the heating medium, each of the small particles or droplets of the charging stock is quickly exposed to the heat of the heating medium surrounding the same, and such heat reduces hydrocarbons in each of the particles or droplets to solid carbon and decomposes sulfuric acid therein to form sulfur dioxide gas. It will be understood, of course, that other decomposition products may also be formed. For example, where acid sludge is used as the charging stock it is decomposed into solid carbon particles, sulfur dioxide, water vapor, and a relatively small amount of hydrocarbon vapor.

Due to the efficient heating provided by my method, the carbon particles formed are substantially dry before they first strike the walls of the reaction chamber 11, and thus do not tend to stick thereto or ball up in the reaction chamber. By controlling the degree of atomization of the charging stock, as described above, the size of the resulting carbon particles is controlled, and this control feature may be employed to selectively produce solid particles ranging from only a few microns in size to solid particles which will just pass through a twenty-mesh screen, although I do not desire to be limited to such range of particle sizes, as those specified are illustrative only. Particles within such range of sizes are readily conveyed through the reaction chamber 11 by the gaseous heating medium employed, and pass therefrom, together with the gaseous decomposition products, through the pipe connection 25 into the separator 12.

In the separator 12 most of the solid particles of carbon fall to the bottom thereof by gravity and thus separate from the gaseous heating medium and the gaseous products of decomposition, although some may be carried along with the gases passing from the separator through the gas discharge pipe 29. If the amount of such carbon particles carried by the gases passing through the discharge pipe 29 is objectionable they may be separated by conventional means. Such particles may be removed from the separator 12 through the discharge port 26 thereof as desired, and conveyed to a suitable point of use or storage (not shown), the resulting particles being suitable for many industrial uses.

The gaseous part of the flow stream passes out of the top of the separator 12 through the pipe connection 28 into the gas discharge pipe 29. A portion thereof flows through the conduit 31 to the main booster blower 13, and the balance of the gaseous flow stream passes through the valve 30 and flows to a point of disposal or use (not shown). It will be appreciated, of course, that until the system has been brought up to the required operating pressure, no gaseous decomposition products will pass the relief valve 30, which is set to maintain the desired operating pressure in the system. However, as soon as such desired operating pressure in the system is attained, excess gaseous decomposition products are permitted to pass from the system by the valve 30.

The gaseous flow stream conveyed through the conduit 31 to the booster blower 13 is recycled through the injector 10, and back into the reaction chamber 11, to serve as a gaseous heating medium and a gaseous atomizing medium for additional charging stock injected into the reaction chamber as described above. This flow of recycled decomposition gases is preferably divided into an atomizing portion forming the atomizing medium and a heating portion forming the heating medium, the atomizing portion being conveyed through the atomizing gas pipe 43 and the valve 44 to the auxiliary blower 14 which in turn conveys it through the pipe 45 into the secondary chamber 57 of the injector 10. The heating portion is conveyed through the conduit 32, the gas heater 15, and the conduit 38 to the primary chamber 51 of the injector 10. The pressure of the atomizing portion is raised by the auxiliary blower 14 to a value sufficient to atomize the charging stock, as described above, which need only be several pounds per square inch above the general system pressure. The heating portion is heated in the gas heater 15 by the burner 37 so as to raise the temperature thereof to a value at which it will decompose the charging stock in the reaction chamber 11. As will be apparent, the valve 44 may be adjusted to control the relative volumes of the atomizing and heating portions of the recycled gases. I have found that the system may be efficiently operated if the heating portion and the atomizing portion have approximately the same volumes, and if the total weight of the atomizing portion is approximately twice the weight of the charging stock. If desired, all of the recycled gas may be utilized as an atomizing medium as well as a heating medium by simple rearrangement of the pipe connections, although this is uneconomical because it would require that all of such recycled gas be raised to an atomizing pressure, which is not necessary in the system as shown and described above. The main booster blower 13 is operated to furnish only sufficient pressure to the recycled gas to force the heating portion thereof back to the reaction chamber 11 through the conduit 32, the gas heater 15, the conduit 38, and the injector 10.

While the temperatures employed in the reaction chamber 11 may vary somewhat with charging stocks of different characteristics, and to produce various decomposition products, I have found that temperatures approximately in the range of 500° F. to 900° F. may be employed in the reaction chamber to treat a charging stock such as a pressure distillate acid sludge containing about 60% titratable sulfuric acid content, and the bulk of the balance constituting hydrocarbons. Utilizing a reaction chamber six feet long and ten inches in internal diameter maintained at a gauge pressure of 40 to 50 pounds per square inch, if the chamber is maintained at a temperature of approximately 900° F. at its inlet end (i. e., the end thereof adjacent the injector 10) the temperature at the outlet end will be approximately 600° F., which provides a suitable range of treating temperatures for such charging stock in the reaction chamber. This relatively small temperature drop between the inlet and outlet ends of the reaction chamber 11 clearly illustrates the high heating efficiency in the reaction chamber, although it is to be noted that the decomposition of sulfuric acid sludge is frequently an exothermic reaction and compensates in part at least for normal heat losses in the system. It will thus be appreciated that by recycling and utilizing a portion of the gaseous decomposition products as a heating medium for additional charging stock, such recycled gases need only be raised in temperature a relatively small amount to bring them up to the temperature required at the inlet end of the reaction chamber 11. Obviously, this requires only a fraction of the heat which would be required in using an independent heating medium from an outside source, and provides for the system a high overall heat efficiency, contributing greatly to the economy of operation of the invention. While it will probably be self-evident to those skilled in the art, it may be stated that the temperature imparted to the heating portion of the recycled decomposition gases is somewhat dependent upon the proportion between the total volume of recycled gases and the volume of charging stock.

As soon as gaseous decomposition products are being produced in quantity in the reaction chamber 11 and a sufficient portion thereof is being recycled and injected back into the reaction chamber through the injector 10, such recycled gases are thereafter used as the heating medium, and the supply of steam through the pipe 34 or combustion products through the pipe 40 may be discontinued by closing the appropriate valve 35 or 41, respectively. Thereafter, the recycled gas may be profitably employed as the sole heating medium. It is to be noted, however, that if a cheap source of hydrogen sulfide is available and sulfur dioxide and carbon are desired as end products it may be desirable to continue the burning thereof in the burner 16 and to continue to supply the combustion products thereof through the supply pipe 40 to the conduit 38, in lieu of the operation of the gas heater 15, to supply the required heat to the recycled gases. The burning of hydrogen sulfide, of course, supplies not only desirable heat but also additional sulfur dioxide which enriches the recycled gases therewith, which, if sulfur dioxide is a desired end product, may be desirable. It is also to be noted that the gas volume in the recycled portion of the system is constant after the apparatus is in self-sustaining operation, and that therefore the gaseous decomposition products discharged through the pressure relief valve 30 to the gas discharge pipe 29 are equivalent in quantity to the gaseous decomposition products produced in the reaction chamber 11.

It is also important to note that, in the preferred practice of the invention, in which the burner 16 is not employed except possibly for starting the operation of the process, there is no dilution of the gaseous decomposition products produced in the reaction chamber 11, which is an important feature of the invention. In various prior art processes employing combustion of fuel to provide the heat of decomposition, great difficulty has been experienced with such dilution of the decomposition gases by air, the compounds of which, such as nitrogen, must be subsequently separated from the decomposition gases to provide relatively pure sulfur dioxide where it is desired as an end product. In my process no such undesirable dilution occurs, and the decomposition gaseous product may have a content of sulfur dioxide where such product is desired, in concentrations at least as high as 80% sulfur dioxide by weight in the gaseous product produced after any water vapors have been condensed, which is a substantially higher sulfur dioxide content than that produced by any conventional process of which I have knowledge.

Some further description of the operation of the injector 10 is required. As will have been noted, the atomizing portion of the recycled gases is introduced into the secondary chamber 57 of the injector 10, between the rotatable cup member 74 and the primary chamber 51, and thus between the charging stock passing through the injector and the heating medium passing through the primary chamber. Since the atomizing portion of the recycled gases does not, in the preferred practice of the invention, pass through the gas heater 15 it is at substantially lower temperature than the heating portion thereof, and thus serves in the injector 10 as fluid insulation between the heating portion and the charging stock, retarding the decomposition of the charging stock until it enters the reaction chamber 11. If desired, this insulating effect may be increased by providing additional cooling means in the pipes 43 or 45, such as, for example, a conventional cooling jacket therearound. Such independent cooling of the atomizing portion, however, is not ordinarily desirable as it necessitates raising the temperature of the heating portion to a higher temperature than is otherwise necessary in order to compensate in the reaction chamber 11 for such cooling, with an attendant increase in fuel consumption. Such additional cooling is not necessary where my specific type of injector 10 is employed, as additional means are provided therein for insulating between the heating medium and the charging stock. First, the conical layer of heat insulation material 63 serves to assist in the accomplishment of this purpose. Secondly, a fluid cooling medium, such as relatively cold oil, is circulated through the injector 10 from the pipe connection 72 to the pipe connection 70, passing through the inner chamber 71 around the tubular sleeve 64 and outwardly through the helical chamber formed by the coil 68 between the separating wall 66 and the wall 62. This flow of cooling medium additional insures that the relatively high temperature of the heating medium in the primary chamber 51 will not be communicated to any undesirable extent to the charging stock in the rotatable cup member 74.

Since the fluid pressure in the reaction chamber 11 is substantial, as described above, it is desirable to provide means for preventing decomposition gases therein from passing back between the rotatable cup member 74 and the inner wall 64 of the injector, as condensation of such gases tends to corrode the metal parts of the injector. This is prevented by injecting a flow of a cool inert gas through the pipe connection 77 at a pressure slightly higher than the operating pressure in the reaction chamber, which effectively prevents the entrance of decomposition gases between the rotatable cup member 74 and the inner wall 64.

It will thus be appreciated that my apparatus and method fulfill the objects set forth hereinabove, and provide the features and advantages noted. While I have described a preferred embodiment of the invention, I do not intend to be limited thereto but desire to be afforded the full scope of the following claims.

I claim as my invention:

1. In a process adapted to produce carbon particles from a liquid material containing hydrocarbons, the steps of: conveying said material through a decomposing zone under such conditions of temperature and pressure as to decompose said material to form solid carbon particles and gaseous decomposition products; separating said carbon particles from said decomposition products; recycling a portion of said gaseous decomposition products through said decomposing zone; raising the temperature of said recycled decomposition products so that they will decompose said material admitted to said zone; and recycling another portion of said decomposition products at elevated pressure into said zone with said material to atomize said material in said zone.

2. A process as in claim 1 including the steps of: producing hot combustion gases at temperatures at least sufficient to decompose said material; and combining said hot combustion gases with said portion of said gaseous decomposition products raised to said temperature to decompose said material, said hot combustion gases and said decomposition products to which they have been added being introducted into said decomposing zone.

3. In a process adapted to produce carbon particles from a liquid material containing hydrocarbons, the steps of: conveying said material through a decomposing zone under such conditions of temperature and pressure as to decompose said material to form solid carbon particles and gaseous decomposition products; separating said carbon particles from said decomposition products; recycling at least a portion of said gaseous decomposition products through said decomposing zone; and raising the temperature and pressure of said recycled decomposition products so that they will atomize said material admitted to said zone and will decompose the same therein.

4. In a process of treating a liquid material containing sulfuric acid, the steps of: conveying such material through a decomposing zone under such conditions of temperature and pressure as to decompose at least a portion of said material to form gaseous decomposition products; recycling a portion of said gaseous decomposition products through said decomposing zone under pressure to atomize said material; and raising the temperature of and recycling a portion of said decomposition products so that they will decompose further material admitted to said zone.

5. In a process of treating a liquid material containing sulfuric acid, the steps of: conveying such material through a decomposing zone under such conditions of temperature and pressure as to decompose at least a portion of said material to form gaseous decomposition products; recycling a portion of said gaseous decomposition products through said decomposing zone; and burning hydrogen sulfide and mixing the combustion products thereof with said recycled decomposition products to raise the temperature of said recycled decomposition products so that they will decompose further material admitted to said zone.

6. In a process adapted to produce solid carbon particles from a liquid charging stock containing hydrocarbons, the steps of: conveying a flow of said charging stock through a decomposing zone under such conditions of temperature and pressure as to decompose said charging stock to form solid carbon particles and gaseous decomposition products; separating said carbon particles from said decomposition products; recycling a first portion of said gaseous decomposition products through said decomposing zone so as to decompose additional charging stock admitted thereto; recycling a second portion of said gaseous decomposition products into said decomposing zone so as to atomize said additional charging stock; heating said first portion before it enters said decomposing zone and independently of said second portion; and raising the pressure of said second portion before it enters said decomposition zone and independently of said first portion.

7. In a process of the character described, the steps of: injecting a first stream of liquid materials containing hydrocarbons and sulfuric acid into a heating zone; injecting a second stream of a relatively cool gaseous atomizing medium into the same zone so as to interrupt said first stream and atomize the material of said first stream; injecting a third stream of a relatively hot gaseous heating medium into said zone so as to reduce said atomized material to fine, solid carbon particles and product gases, withdrawing a portion of said product gases, increasing the pressure of a second portion of said product gases and employing this portion as said second stream, and increasing the temperature of a third portion of said product gases and employing this portion as said third stream.

8. A process according to claim 7 in which the first stream is injected as a central rotating stream, the second stream is injected as a concentric stream surrounding the first stream and rotating in the opposite direction, and the third stream is injected as a concentric stream surrounding both the first and second streams.

9. In a treating apparatus adapted to treat a liquid charging stock including hydrocarbons and sulfuric acid, the combination of: an elongated reaction chamber, a hollow injector cup opening into said reaction chamber at one end thereof, conduit means for introducing said charging stock into the other end of said injector cup, a secondary chamber surrounding said injector cup and discharging into said reaction chamber through an annular orifice adjacent to and surrounding the discharge end of said injector cup, a primary chamber surrounding said secondary chamber and discharging into said reaction chamber at points adjacent to and surrounding said annular orifice, a separator vessel connected to the end of said reaction chamber opposite from said injector cup and adapted to receive and separate solid and gaseous reaction products, conduit means for removing solid reaction products from the lower portion of said separator vessel, conduit means for separately removing gaseous reaction products from the upper portion of said separator vessel, a pump for increasing the pressure on a portion of the gaseous reaction products removed from said separator vessel, conduit means for recycling said portion from said separator vessel through said pump to said secondary chamber, a heater for increasing the temperature of a second portion of the gaseous reaction products removed from said separator vessel, and conduit means for recycling said second portion from said separator vessel through said heater to said primary chamber.

10. An apparatus according to claim 9 in which the injector cup is conical in shape with the larger end discharging into the reaction chamber, and the secondary chamber has conical walls, the smaller ends of which form the annular orifice discharging into said reaction chamber.

11. An apparatus according to claim 10 in which means are provided for rotating said conical cup about its axis, and the secondary chamber is equipped with vanes which are adapted to impart to the gas discharged through said annular orifice, a spiral motion rotating in a direction opposite to the direction of rotation of the injector cup.

ROBERT T. COLLIER.

REFERENCES CITED

The following references are of record in the file of this patent:

UNITED STATES PATENTS

| Number | Name | Date |
|---|---|---|
| 2,043,646 | Bahlke | June 9, 1936 |
| 2,091,937 | Rumple | Aug. 31, 1937 |
| 2,091,943 | Gilchrist | Aug. 31, 1937 |
| 2,097,271 | Debuch et al. | Oct. 26, 1937 |
| 2,417,386 | Titlestad | Mar. 11, 1947 |